DRIVE SYSTEMS

Filed Aug. 16, 1962 2 Sheets-Sheet 1

INVENTOR
NORMAN M. EMSLIE
BY
F. D. Prager
ATTORNEY

INVENTOR.
NORMAN M. EMSLIE
BY
F. O. Prager
ATTORNEY

United States Patent Office 3,189,240
Patented June 15, 1965

3,189,240
DRIVE SYSTEMS

Norman M. Emslie, Yardley, Pa., assignor to Philco Corporation, Philadelphia, Pa., a corporation of Delaware
Filed Aug. 16, 1962, Ser. No. 217,387
2 Claims. (Cl. 226—95)

Figures 1, 2, 3:
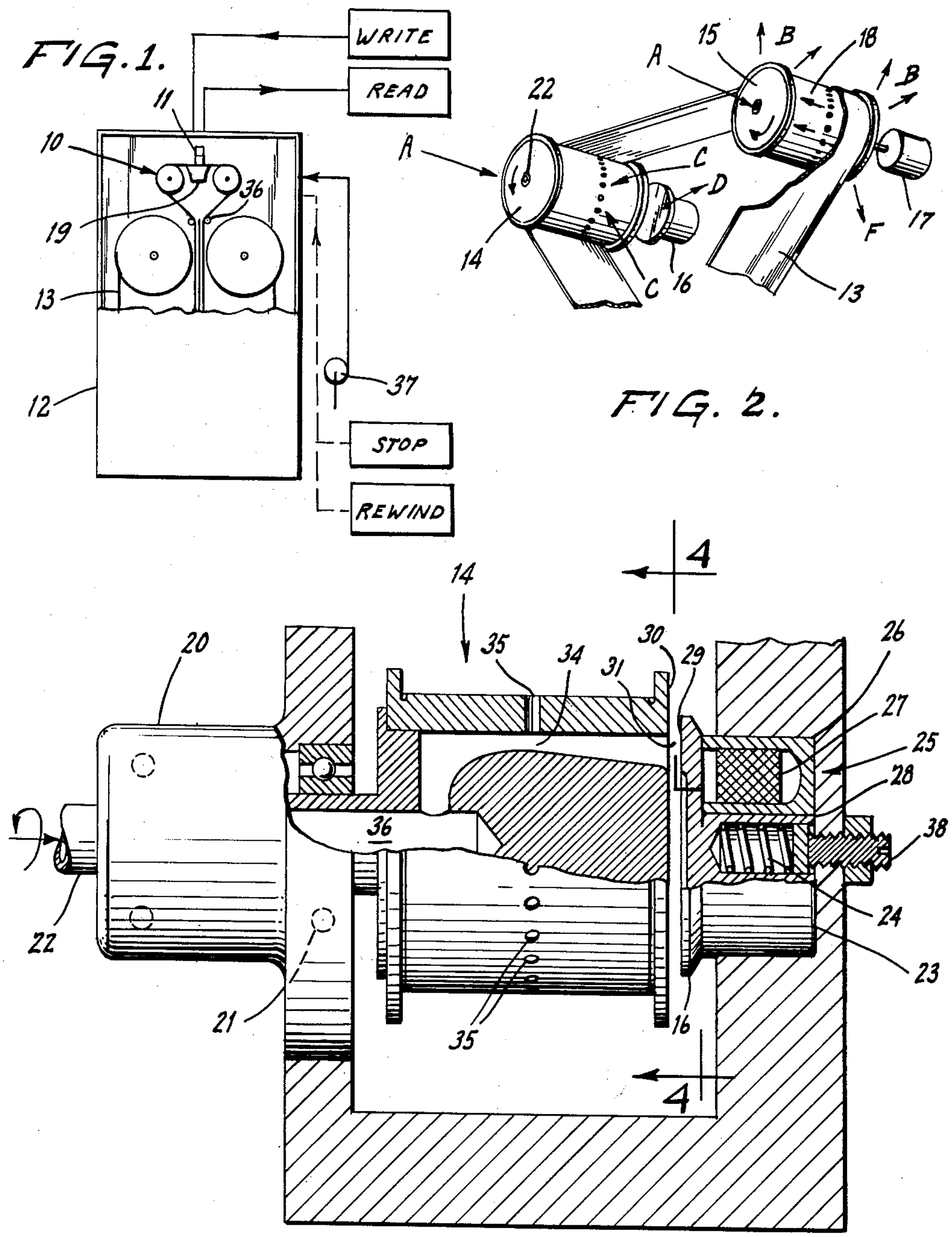

My invention relates generally to "tape drives" and particularly to drive systems for magnetic information storage tapes as used in computers. The invention has to do with problems of tape acceleration and deceleration, which can briefly be stated as follows.

The tape usually travels at a high rate of speed during the normal reading and writing of information thereon. However, for reasons to be described hereinafter the machine must frequently stop and must then resume the rapid motion of the tape for further writing or reading. In some instances the machine must begin an even more rapid rewinding operation, that is, accelerate the tape in reverse direction. These stopping and starting operations, which can typically be needed after mere milliseconds of useful reading or writing time, are often controlled pneumatically, which has a number of advantages including the fact that the tape then is well protected from injury which might be inflicted by contact rollers or the like. However, in pneumatic as well as other control systems relatively long intervals were thus far consumed in each stopping and starting operation. These relatively long intervals, often amounting perhaps to ten or more milliseconds, are not satisfactory, since it is desirable that the time consumed in acceleration and deceleration be small as compared with the useful drive time.

Dramatic improvement of this situation has been desired for some considerable time and is provided by this invention. It is a primary object of the invention to provide for extremely high start and stop speeds of the tape, particularly in a pneumatic tape control system.

Another important object is to make a large number of these rapid accelerations and decelerations possible during each second of machine operation.

A further object is to manipulate the tape by pneumatic apparatus of simple construction which not only reliably affords these rapid and frequent accelerations, motions and decelerations but also insures proper handling of the tape, protecting it safely from malfunctioning and injury and making it possible to use the tape many times.

These objects can be achieved since I have discovered that the pneumatic controls thus far applied involve an unnecessary time lag. I have modified the construction of the apparatus to almost completely eliminate such time lag and to effect pneumatic starting and stopping of tape within time intervals of hitherto unattainable brevity. At the same time the invention retains the known advantages of pneumatic drives, including for instance the avoidance of pressure rollers and of their destructive effects upon the memory tape.

The new improvement is provided by no longer relying on a certain former use of valved piping upstream of a capstan for the control of alternate applications of pressure and suction to the interior of the capstan. The invention provides, instead, a pneumatic system with a source of pressure permanently connected to the capstan wheel, and the new arrangement includes a suction generating system substantially disposed in the capstan structure itself. By means of this expedient the needed shifting of inertial masses of air, in each transition between driving and non-driving positions for the tape, can be performed at unusually high and consistent rates.

This will be appreciated more fully upon a review of the following description of a preferred embodiment, wherein reference is made to the drawing appended hereto. In this drawing FIGURE 1 is a front view of a memory cabinet, partly broken away to show the new tape drive. FIGURE 2 is a perspective view, on a larger scale, schematically showing this tape drive by itself. FIGURE 3 is a side view, partly in section, of a capstan structure forming part of this drive.

Figure 5:
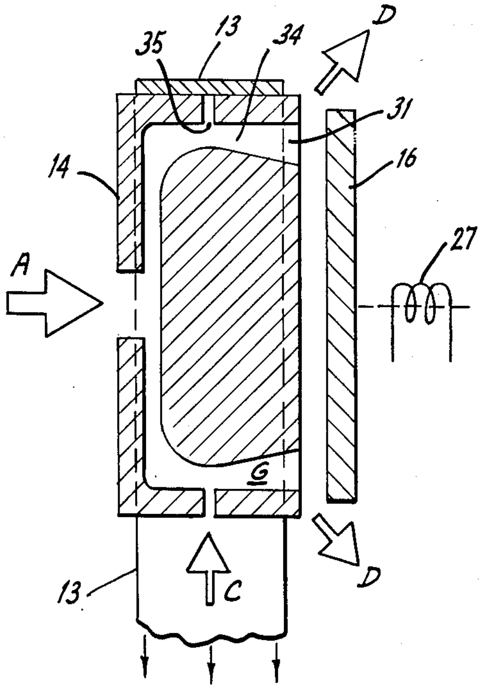
Figure 6:
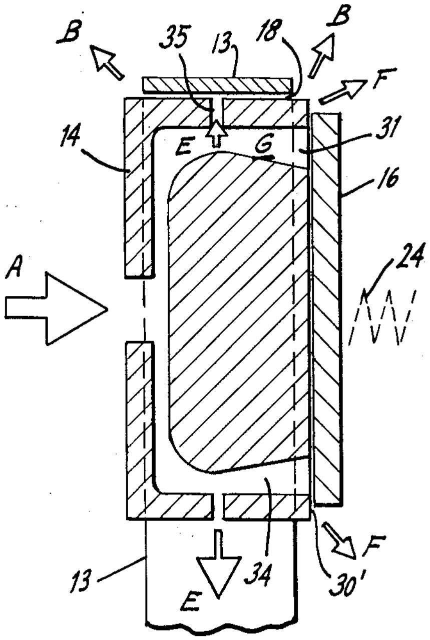
Figure 4:
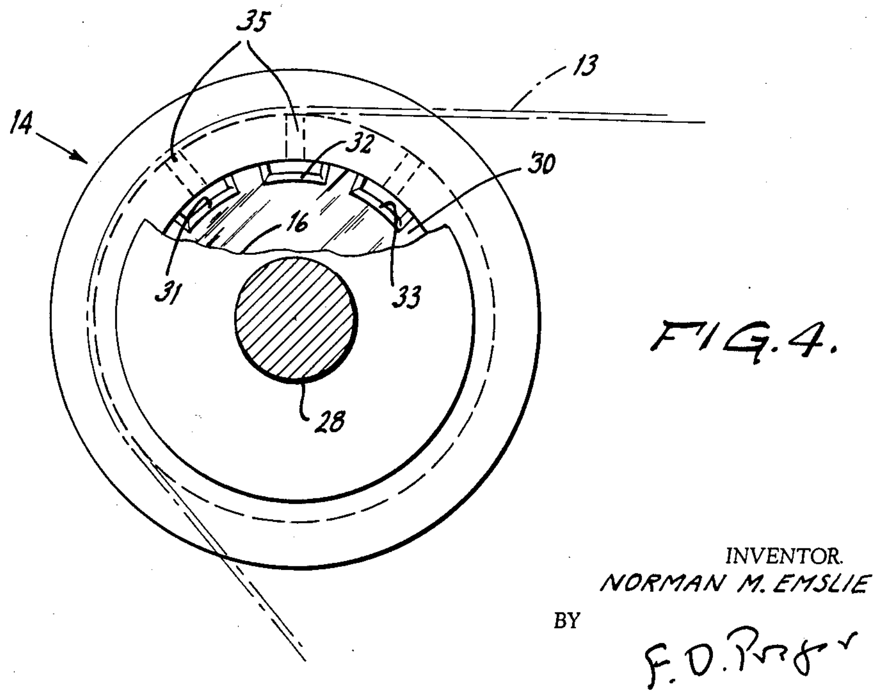

FIGURE 4 is an end view of this capstan structure, taken generally along lines 4—4 in FIGURE 3. FIGURES 5 and 6 are schematic views of the same capstan structure. They show, respectively, open and throttled conditions of a new valve unit which controls the suction generating means in the capstan wheel.

For general orientation, FIGURE 1 shows tape drive or capstan mechanism 10 directly below magnetic head unit 11, in the upper portion of cabinet 12 which also, therebelow, contains storage reels for magnetic tape 13. As is indicated by legends and arrows, head 11 serves to "write" (magnetically) on tape 13 and to "read" therefrom, at which time the tape travels at such a speed as 100 or 150 inches per second. The terms "read" and "write" are meant to include also auxiliary operations such as erasing and correcting. Provision is made whereby these several operations can at times be performed incident to a "rewind" or reverse drive operation, and as mentioned there are pauses during which the tape is required to "stop," as additionally suggested by FIGURE 1.

The magnetic reading and writing of information on typical tape 13 proceeds typically at a rate such as 120 inches per second and the tape can for instance have sixteen channels including twelve information channels. The rate of 120 inches then typically equals two sets of about 45,000 six-bit frames per second, with a gross total of about 540,000 bits per second. Practically speaking this involves 45 sets of two transversely aligned frames per millisecond. It is often desirable to provide for the reading, erasing and writing of individual frames. Thus far, however, as initially mentioned, each stopping and re-acceleration of the tape has typically consumed an interval such as about ten milliseconds, so that after the reading or writing of any one frame, the equivalent of many frames has often remained unused, or at least imperfectly and all too slowly used because of the inherent relative slowness of starting and stopping. This conventional ratio of utilization of the magnetic electronic reading and writing equipment provides an all-too low percentage of utilization of the time basically available for reading and writing.

An additional trouble of present machines is that their pneumatic time lag is dependent on past history or operation. When the machine is operated at high rates of cycling between drive and no-drive conditions, the lines and cavities of the pneumatic control system are less able than otherwise to attain fully evacuated or fully pressurized condition between the pneumatic switch-over operations, thereby causing seriously inconsistent time intervals for individual starting and stopping operations dependent on previous frequency of such operations.

The invention improves these conditions in several ways. In the first place it improves the ratio of utilization of the electronic equipment by at least a complete order of magnitude. Additionally it provides substantially more consistent time characteristics of the pneumatic switching operation. Both improvements are obtained by means of a new pneumatic system which for the first time allows the use of greatly reduced volume of cavities filled with air.

This new system is generally shown in FIGURE 2. It comprises forward drive capstan 14 and reverse drive capstan 15, both permanently connected to air pressure as indicated by arrows A. The two capstans have integrally connected therewith, and downstream with respect to air flowing from the pressure source to and through the capstans, two valve units shown at 16 and 17, the latter unit being schematically shown in throttled position and thereby providing for formation of an air bearing 18 under the tape on reverse drive capstan 15, wherefrom air escapes as suggested by the outwardly directed arrows B; the exact pattern of the air currents will be explained hereinafter. The other valve unit 16 is schematically illustrated as being fully open, and it will be shown hereinafter that provision is thereby made for suction of air into forward drive capstan 14 in the approximate directions of the inwardly directed arrows C, which operation causes suction-actuated clutching engagement between this latter capstan and the tape portion wrapped around it, thereby causing this capstan to drive the tape. Both capstan wheels rotate continuously, in opposite directions as shown by the curved arrows. Forward and rearward accelerations and motions of the tape are achieved respectively by applying either (a) air bearing action on capstant 15 with clutching action on capstan 14 or (b) air bearing action on 14 with clutching action on 15. Deceleration and stopping of the tape is achieved by (c) briefly applying air bearing action on both capstans 14 and 15 and simultaneously applying suction to the tape in a stationary brake unit 19 underlying pickup head 11 (FIGURE 1).

The new machine, as already indicated, provides an integral capstan wheel and valve combination. This can be the same for the forwardly driving wheel 14 and the reverse driving wheel 15, and is shown in FIGURE 3 as applied to the former element. A bearing unit 20 provides support and guidance for ball bearings 21 of a hollow horizontal capstan shaft 22 (also indicated but broken off in FIGURE 2), which is driven by a suitable motor structure (not shown). Opposite this bearing unit and capstan shaft and coaxially therewith, FIGURE 3 shows a valve manipulator 23 which supports valve unit 16 and provides for small horizontal reciprocatory movements of this valve unit. It applies the mechanical force of a spring 24, pushing the valve unit toward the left, and at other times applies the magnetic force of a solenoid 25 retracting the valve unit toward the right against the force of the spring. The unit is shown in FIGURE 3 in this latter, rightwardly retracted position. It is believed unnecessary to describe details of solenoid shell 26, coil 27 and armature 28, since the invention is not concerned with these elements, per se, which may be of any suitable known type.

It is important, however, to consider the arrangement and operation of the capstan valve unit 16, secured to this armature. As clearly indicated by FIGURES 2 and 3 this valve unit is disposed directly adjacent to and downstream of the capstan wheel in the path of air which is provided for the pneumatic control of the tape and which enters an upstream end of the capstan at 22. Heretofore, by contrast, a pair of external valves were usually provided, both upstream of the capstan. They connected the capstan variably to external sources of pressure and vacuum.

As further shown by FIGURE 3 and additionally by FIGURE 4, the new valve unit 16 has an annular disc surface 29 parallel to and closely spaced from an end surface 30 of capstan wheel 14. These surfaces are desirably smooth and polished, and the latter end surface 30 preferably contains a ring of outlet ports 31, 32, 33, etc. leading from venturi ducts 34 formed in outer portions of the capstan wheel. These ducts are peripherally distributed around the wheel and are oriented with their longitudinal axes parallel to shaft 22. As indicated in FIGURE 3 they can be formed as slots, either cast or machined into the surface of an inner portion of wheel 14. The capstan wheel is further shown as having a ring of ports 35 radially extending through an outer portion of the wheel and piercing its outermost cylindrical surface. Each port 35 is connected to the throat of a venturi slot 34. The inlet ends of the venturi slots or ducts are connected to a central air supply passage 36 extending axially through shaft 22 and into the capstan. By means of this arrangement, precisely coaxial arrangement of inner and outer capstan portions is readily provided and maintained, with equipment of limited mass, as is desirable in the construction of a high-speed capstan unit. In addition the mass of air, present at any time in the venturi system, is thus minimized which is desired for reasons to be developed presently.

When solenoid coil 27 is energized, by electric energy supplied through suitable conductors, not shown, the downstream capstan valve unit 16 is fully opened, as schematically shown in FIGURE 5. In this condition substantially all of the air supplied to the capstan (see central horizontal arrow at left) passes through the venturi ducts 34 and their terminal outlet ports 31 etc. and escapes between capstan wheel 14 and valve unit 16 (see slanted arrows D at right). As the air rushes through the constricted or throat sections of the venturi ducts a partial vacuum or suction is developed in these sections and in the radial ports 35 connected thereto. This condition causes atmospheric air to enter those of ports 35 which are not covered by tape (lower vertical arrow C), while clutching tape 13 firmly to the capstan wheel areas underlying the tape. The tape is then propelled by the continuing rotation of the capstan wheel. Slight but definite forces exist which offer some little resistance to such propulsion; they include for instance the weight of tape to be raised by the capstan, the friction of tape-guiding rollers 36 (FIGURE 1), and the like. The sum total of such resisting forces is easily and uniformly overcome by the driving force of rotating shaft 22 which due to the clutching effect, as described, is transmitted to the tape.

In order to stop the tape, downstream valve unit 16 is throttled by de-energizing its solenoid and by thus giving full effect to the force of its spring 24. For a short time the other valve unit 17 (FIGURE 2) also remains similarly throttled. Both capstans then are in the position of FIGURE 6, wherein substantial portions of the centrally supplied air (horizontal arrow A) are forced to escape from the throats of venturi passages 34 through radial ports 35 (upward and downward vertical arrows E), thus forming the aforementioned air bearings 18 and finally escaping therefrom to the atmosphere (uppermost slanted arrows B). Both wheels rotate but neither engages the tape. In order to terminate continuing inertial movement of the tape, suction for braking action is applied to the tape by stationary brake unit 19 (FIGURE 1), which for this purpose has a suitably controlled suction connector device or vacuum generator of its own (not shown).

As soon as the tape has thus been brought to rest from motion by forward drive capstan 14 it can be re-accelerated and can for instance be engaged by reverse drive capstan 15. For this latter purpose valve unit 17 of this capstan is then fully opened; this reverse drive capstan 15 is then in a condition analogous to that of FIGURE 5, described above, while forward drive capstan 14 remains in the throttled condition of FIGURE 6, thus reversing the condition of FIGURE 2.

In the last-mentioned, throttled condition of a capstan (FIGURE 6), an air bearing is desirably formed not only at 18 under tape 13 but also, in the interest of minimum friction, at 30′ between the mutually facing, smooth surfaces of valve disc 16 and capstan 14. Air escaping from this latter bearing area is indicated by the upper and lower, slanted arrows F at the extreme right in FIGURE 6.

It will readily be seen that operation of the drive system of FIGURE 2, wherein both capstans 14, 15 continuously rotate in opposite directions and integrally provide either pressure or suction at 35, insures that tape 13 is successively (*a*) clutched to be accelerated and driven forwardly by one capstan, (*b*) brought to rest on two air bearings, and then again (*c*) clutched and accelerated (for instance in reverse direction, by the other capstan wheel). In each of these individual phases of the cycle, a pneumatic reversal from pressure to suction, or from suction to pressure as applied to the tape at 35, is provided by at least one of the capstan units, and by virtue of the new internal suction generators (venturis 34 and closely allied downstream valve unit 16) this pneumatic reversal occurs much more rapidly than in prior systems. Thus I can and do dispense with the former upstream system of valved pipe connections to the capstan wheel, and thereby eliminate the considerable pneumatic time lag caused by this former system.

This gain is further explained by the fact that according to the invention the pneumatic switch-over of the tape, radially of the capstan, is achieved by a minor rerouting of moving, guided air currents in cavities of the pneumatic control system. According to the invention no such re-routing is done except within the capstan itself and more specifically, at and between venturi ports 31, 35. A significant change of air flow characteristics, in any mass of moving and positively guided air, occurs only within the minute volume of the downstream and port areas 31, 35 of the venturis, not in the inherently substantial internal volume of any connected upstream piping and valving.

This will be understood more thoroughly upon a close comparison of FIGURES 5 and 6 with respect to the pneumatic conditions successively prevailing in downstream portions G of venturis 34. As already noted, these portions occupy relatively small spaces. Air currents in rightward direction occur permanently in these spaces and in the entire length of each venturi of each rotating capstan. During the clutching operation (FIGURE 5) the air moves relatively rapidly in this direction in each small downstream region G and outlet 31; slower rightward air flow occurs in these areas during the unclutching or air bearing operation (FIGURE 6). Substantially uniform rightward air flow occurs in the remainder of the length of the rotating venturi passages at all times. The transient state, wherein the guided air flow at G, 31 changes from the condition of FIGURE 5 (large and rapid air flow) to that of FIGURE 6 (small and slow air flow), or vice versa, requires only the acceleration or deceleration of such minor amount of moving, guided air masses as are present in these areas G, 31. There is no reversal of guided air flow, except in the still smaller port regions 35. As a result, only minimal loss of time is involved in the change-over or transient state, thus allowing many of these change-overs during minor fractions of a second.

In conventional systems, by contrast, alternate upstream connections are made from the capstan wheel to external sources of pressure and vacuum, through valved piping upstream of the capstan, and the entire, relatively enormous masses of air in such connecting ducts are moved, compressed or expanded from an air clutching state to an air bearing state for the tape. Major volumes of piping, in the upstream connector system, are then periodically filled up with and relieved of surging air, at higher or lower or transiently changing pressure, whereby the result of mechanical motion of valve structure (the desired transitional motion of the computer tape from a clutched condition to air bearing condition or vice versa) is badly delayed in such conventional systems.

It is further to be noted that the new, rapid acceleration and deceleration of air masses for pneumatic control of the tape, and the correspondingly consistent operation of the new tape control has been achieved by very simple mechanism. The single, integral, downstream valve unit 16 or 17 provides direct and reliable control over the derivation of air bearing action or air clutching action, from the pneumatic energy constantly delivered to the capstan by the single upstream pressure source 37 (FIGURE 1). It provides this control under an adjustment of the utmost simplicity, which basically requires only an adjusting screw 38 (FIGURE 3), for varying the pressure of valve spring 24 and for thereby providing the proper dimensioning of air bearing 30' (FIGURE 6) between the valve surfaces.

While only a single embodiment of the invention has been described, the details thereof are not to be construed as limitative of the invention. The invention contemplates such variations and modifications as come within the scope of the appended claims.

I claim:

1. In tape driving apparatsu, a generally cylindrical wheel for releasably driving a tape, said wheel having therein a series of Venturi passages which have inlet and outlet portions respectively adjacent a first end surface and an opposite end surface of the wheel, each passage having a restricted neck located closely adjacent the peripheral and tape-engaging surface of the wheel; inlet means for feeding compressed air or the like from outside the wheel into said inlet portions; valve means facing said opposite end surface of the wheel for controlling the outlet portions of said passages; and duct means extending from said peripheral surface of the wheel substantially directly to said restricted necks.

2. A wheel as described in claim 1, wherein substantially the entire extent of each Venturi passage is disposed closely adjacent the peripheral surface of the wheel.

References Cited by the Examiner

UNITED STATES PATENTS

| | | | |
|---|---|---|---|
| 2,581,450 | 1/52 | Seeler | 137—64 X |
| 2,954,911 | 10/60 | Baumeister et al. | 226—95 |

RAPHAEL M. LUPO, *Primary Examiner.*

ANDRES H. NIELSEN, ABRAHAM BERLIN, *Examiners.*